(12) United States Patent
Chen et al.

(10) Patent No.: US 7,833,631 B2
(45) Date of Patent: Nov. 16, 2010

(54) MULTI METAL BASE THERMAL RESISTANCE ALLOY AND MOLD WITH MULTI METAL BASE THERMAL RESISTANCE ALLOY LAYER

(75) Inventors: Chi-San Chen, Hsinchu (TW);
Chih-Chao Yang, Hsinchu (TW);
Chih-Jung Weng, Hsinchu (TW);
Chao-Ming Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 998 days.

(21) Appl. No.: 11/644,415

(22) Filed: Dec. 22, 2006

(65) Prior Publication Data

US 2007/0151700 A1 Jul. 5, 2007

(30) Foreign Application Priority Data

Dec. 30, 2005 (TW) .............................. 94147552 A

(51) Int. Cl.
*B32B 15/01* (2006.01)
(52) U.S. Cl. ....................... 428/656; 428/668; 428/678; 420/586
(58) Field of Classification Search ................... 420/586
See application file for complete search history.

(56) References Cited

U.S. PATENT DOCUMENTS

| 3,243,287 A | * | 3/1966 | Lillys et al. | 420/586.1 |
| 3,663,213 A | * | 5/1972 | Eiselstein et al. | 420/586.1 |
| 3,843,332 A | * | 10/1974 | Kindlimann | 428/594 |
| 3,865,644 A | * | 2/1975 | Hellner et al. | 420/47 |
| 4,353,742 A | * | 10/1982 | Crook | 420/585 |
| 4,637,451 A | * | 1/1987 | Perrella et al. | 164/342 |
| 5,077,006 A | * | 12/1991 | Culling | 420/584.1 |
| 6,284,323 B1 | | 9/2001 | Maloney | |
| 6,521,353 B1 | | 2/2003 | Majagi et al. | |
| 6,756,131 B2 | | 6/2004 | Oguma et al. | |
| 6,764,779 B1 | | 7/2004 | Liu et al. | |
| 6,803,135 B2 | | 10/2004 | Liu et al. | |
| 6,916,551 B2 | | 7/2005 | Torigoe et al. | |
| 6,924,040 B2 | | 8/2005 | Maloney | |

FOREIGN PATENT DOCUMENTS

| CN | 1344188 A | 4/2002 |
| CN | 1498984 A | 5/2004 |
| TW | 422887 | 2/2001 |
| TW | 567230 | 12/2003 |

OTHER PUBLICATIONS

Huang, P. et al., Multi-Principal-Element Alloys with Improved Oxidation and Weat Resistance for Thermal Spray Coating, 2004, Advanced Engineering Materials, vol. 6 No. 1-2 pp. 74-78.*

* cited by examiner

*Primary Examiner*—Jennifer C McNeil
*Assistant Examiner*—Adam C Krupicka
(74) *Attorney, Agent, or Firm*—Tim Tingkang Xia; Morris, Manning & Martin, LLP

(57) ABSTRACT

A multi metal base thermal resistance alloy and a mold with the multi metal base thermal resistance alloy layer are provided. The weight percent of each element in this alloy is less than 45%. The structure of the alloy is an amorphous structure and the phonon thermal conductivity of the amorphous structure is intrinsically low. Therefore, the alloy is a metal material with low thermal conductivity coefficient and high thermal stability, which can increase the heat retaining property of the die casting mold, enhance the forming yield and stability of a metal sheet with a low fusion point, and is suitable to be used as a thermal-resistance coating material on die casting molds.

7 Claims, 18 Drawing Sheets

| symbol of element | | Ni | Co | Fe | Cr | Si | Al | Ti | hardness value | slit length (μm) | thermal conductivity coefficient |
|---|---|---|---|---|---|---|---|---|---|---|---|
| A1 | molar ratio | 1 | 1 | 1 | 1 | 1 | 1 | 1 | 879 | 125 | 8.90 |
| | weight percent | 17.87 | 17.94 | 17.00 | 15.83 | 8.55 | 8.21 | 14.58 | | | |
| A2 | molar ratio | 1 | 1 | 1 | 0.2 | 0.2 | 0.2 | 0.2 | 319 | 0 | 9.12 |
| | weight percent | 28.70 | 28.82 | 27.32 | 5.09 | 2.75 | 2.64 | 4.69 | | | |
| A3 | molar ratio | 1 | 0.2 | 0.2 | 1 | 1 | 0.2 | 0.2 | 1089 | 196 | 6.50 |
| | weight percent | 33.21 | 6.67 | 6.32 | 29.43 | 15.90 | 3.05 | 5.42 | | | |
| A4 | molar ratio | 1 | 0.2 | 0.2 | 0.2 | 0.2 | 1 | 1 | 843 | 364 | 8.75 |
| | weight percent | 34.01 | 6.83 | 6.47 | 6.03 | 3.26 | 15.64 | 27.76 | | | |
| A5 | molar ratio | 0.2 | 1 | 0.2 | 1 | 0.2 | 1 | 0.2 | 769 | 195 | 7.15 |
| | weight percent | 6.67 | 33.48 | 6.35 | 29.54 | 3.19 | 15.33 | 5.44 | | | |
| A6 | molar ratio | 0.2 | 1 | 0.2 | 0.2 | 1 | 0.2 | 1 | 722 | 427 | 9.32 |
| | weight percent | 6.76 | 33.94 | 6.43 | 5.99 | 16.18 | 3.11 | 27.59 | | | |
| A7 | molar ratio | 0.2 | 0.2 | 1 | 1 | 0.2 | 0.2 | 1 | 956 | 221 | 7.26 |
| | weight percent | 6.17 | 6.19 | 29.35 | 27.33 | 2.95 | 2.84 | 25.17 | | | |
| A8 | molar ratio | 0.2 | 0.2 | 1 | 0.2 | 1 | 1 | 0.2 | 1084 | 498 | 8.50 |
| | weight percent | 7.60 | 7.63 | 36.17 | 6.73 | 18.19 | 17.47 | 6.20 | | | |

Fig. 1

| symbol of element | | Ni | Co | Fe | Cr | Si | Al | Ti | hardness value | slit length (μm) | thermal conductivity coefficient |
|---|---|---|---|---|---|---|---|---|---|---|---|
| B1 | molar ratio | 1 | 1 | 1 | 1 | 0.2 | 1 | 0.2 | 937 | 173 | 7.93 |
| | Weight percent | 23.92 | 24.01 | 21.19 | 11.43 | 4.55 | 10.99 | 3.90 | | | |
| B2 | molar ratio | 1 | 0.6 | 0.6 | 0.6 | 0.2 | 1 | 0.2 | 898 | 156 | 7.00 |
| | Weight percent | 30.92 | 18.63 | 16.44 | 8.87 | 5.88 | 14.21 | 5.05 | | | |
| B3 | molar ratio | 1 | 0.2 | 0.2 | 0.2 | 0.2 | 1 | 0.2 | 741 | 144 | 9.32 |
| | Weight percent | 43.73 | 8.78 | 7.75 | 4.18 | 8.32 | 20.10 | 7.14 | | | |
| B4 | molar ratio | 0.6 | 1 | 0.6 | 0.2 | 0.2 | 1 | 0.2 | 763 | 242 | 8.69 |
| | Weight percent | 19.71 | 32.98 | 17.46 | 3.14 | 6.25 | 15.10 | 5.36 | | | |
| B5 | molar ratio | 0.6 | 0.6 | 0.2 | 1 | 0.2 | 1 | 0.2 | 1003 | 201 | 5.79 |
| | Weight percent | 22.46 | 22.56 | 6.63 | 17.90 | 7.13 | 17.21 | 6.11 | | | |
| B6 | molar ratio | 0.6 | 0.2 | 1 | 0.6 | 0.2 | 1 | 0.2 | 946 | 250 | 8.95 |
| | Weight percent | 21.53 | 7.21 | 31.79 | 10.29 | 6.83 | 16.49 | 5.86 | | | |
| B7 | molar ratio | 0.2 | 1 | 0.2 | 0.6 | 0.2 | 1 | 0.2 | 963 | 277 | 9.03 |
| | Weight percent | 8.06 | 40.46 | 7.14 | 11.56 | 7.67 | 18.53 | 6.58 | | | |
| B8 | molar ratio | 0.2 | 0.6 | 1 | 0.2 | 0.2 | 1 | 0.2 | 880 | 48 | 7.94 |
| | Weight percent | 7.70 | 23.20 | 34.11 | 3.68 | 7.33 | 17.70 | 6.28 | | | |
| B9 | molar ratio | 0.2 | 0.2 | 0.6 | 1 | 0.2 | 1 | 0.2 | 1017 | 248 | 5.79 |
| | Weight percent | 8.99 | 9.03 | 23.91 | 21.50 | 8.56 | 20.67 | 7.34 | | | |

Fig. 4

| embodiment | Cr molar ratio (X) | Cr weight percent (wt %) | Hardness value (Hv) | slit length (μm/indentation) | Thermal Conductivity coefficient |
|---|---|---|---|---|---|
| C1 | 1 | 23.44 | 888 | 79 | 8.26 |
| C2 | 1.2 | 26.87 | 951 | 135 | 9.05 |
| C3 | 1.5 | 31.47 | 1045 | 113 | 7.32 |
| C4 | 1.8 | 35.53 | 1045 | 204 | 9.40 |

Fig. 7

| embodiment | alloy ingredient | hardness value (Hv) | slit length (μm / indentation) | thermal Conductivity coefficient |
|---|---|---|---|---|
| B8 | $Ni_{0.2}Co_{0.6}Fe_{0.2}CrSi_{0.2}AlTi_{0.2}$ | 880 | 48 | 7.94 |
| C1 | $NiCo_{0.6}Fe_{0.2}CrSiAlTi_{0.2}$ | 888 | 79 | 8.26 |
| C3 | $NiCo_{0.6}Fe_{0.2}Cr_{1.5}SiAlTi_{0.2}$ | 1045 | 113 | 7.32 |

Fig. 9

| parameter | plasma spray |
|---|---|
| granule size of the powder | 74~125um |
| main gas and the velocity (L/min) | Ar, 45 L/min |
| added gas and the velocity (L/min) | $H_2$, 12 L/min |
| gas carried by the powder (L/min) | Ar, 3L/min |
| powder feeding speed (g/min) | 20 |
| spraying distance (mm) | 120 |
| current (A) | 650 |
| voltage (V) | 70 |
| diameter of the nozzle (mm) | 1.5 |
| spraying angle | 90 |
| nozzle distance (mm) | 6 |
| horizontal speed (mm/sec) | 32 |

Fig. 11

| | |
|---|---|
| hardness value (Hv) | 580 |
| Young's modulus (GPa) | 13.56 |
| interface residual stress of the coating and the substrate (Mpa) | +17.99 stretch stress |
| bonding strength (Mpa) | 78.05 |
| thermal conductivity coefficient (W/mK) | 3.24 |
| coefficient of thermal expansion (CTE) ($\times 10^{-6}$/°C) | 4.70 |

Fig. 13

| Symbol of element | | Ni | Co | Cr | Si | Fe | Zr | Ti |
|---|---|---|---|---|---|---|---|---|
| D1 | molar ratio | 0.2 | 0.6 | 1 | 0.2 | 0.2 | 1 | 0.2 |
| | weight percent | 5.42 | 16.32 | 24.00 | 2.59 | 5.16 | 42.10 | 4.42 |

Fig. 14

| | |
|---|---|
| hardness value (Hv) | 722 |
| Young's modulus (GPa) | 9.79 |
| interface residual stress of the coating and the substrate (Mpa) | --- |
| bonding strength (Mpa) | 79.30 |
| thermal conductivity coefficient (W/mK) | 3.14 |
| coefficient of thermal expansion (CTE) (×10-6/°C) | 5.69 |

Fig. 16

| material | B8 AlCo$_{0.6}$CrFe$_{0.2}$Ni$_{0.2}$Si$_{0.2}$Ti$_{0.2}$ | | D1 Co$_{0.6}$CrFe$_{0.2}$Ni$_{0.2}$Si$_{0.2}$Ti$_{0.2}$Zr | | SKD61 mold steel |
|---|---|---|---|---|---|
| | block | coating | block | coating | |
| thermal conductivity Coefficient (W/mK) | 7.94 | 3.24 | 6.69 | 3.14 | 28 |
| CTE (×10$^{-6}$/°C) | 4.70 | | 5.69 | | 11~13 |
| Interface residual stress (Mpa) | +17.99 stretch stress | | --- | | |
| hardness value (Hv) | 580 | | 722 | | 450 |

Fig. 17

| mold condition | die casting plunger speed | 0.1(m/s) | 0.2(m/s) | 0.3(m/s) |
|---|---|---|---|---|
| mold without being sprayed and coated with multi metal base thermal resistance alloy | sheet weight(Kg) | 0.185 | 0.207 | 0.260 |
| | filling ratio (%) | 70 | 76 | 95 |
| mold sprayed and coated with multi metal base thermal resistance alloy | sheet weight(Kg) | 0.265 | 0.270 | 0.275 |
| | filling ratio (%) | 96 | 98 | 100 |

Fig. 18

MULTI METAL BASE THERMAL RESISTANCE ALLOY AND MOLD WITH MULTI METAL BASE THERMAL RESISTANCE ALLOY LAYER

CROSS-REFERENCE TO RELATED APPLICATIONS

This non-provisional application claims priority under 35 U.S.C. §119(a) on Patent Application No(s). 094147552 filed in Taiwan, R.O.C. on Dec. 30, 2006, the entire contents of which are hereby incorporated by reference.

BACKGROUND OF THE INVENTION

1. Field of Invention

The present invention relates to a thermal-resistance material, and more particularly to a multi metal base thermal resistance alloy and a mold with the multi metal base thermal resistance alloy layer.

2. Related Art

With the development of the global communication industry, there has been an increasing demand for portable devices such as notebooks (NBs) and cellular phones, which must meet design requirements of being light and small. Taking the notebook for example, conventionally, the housing of the notebook is mainly made of engineering plastics (ABS). However, Mg alloy can be used instead of ABS, and Mg alloy has the advantages of higher density and significantly increased Young's modulus (GPa), as shown in the following table. Besides, Mg alloy further has the environmental protection features of being heat dissipative, electromagnetically shielding, and recyclable.

|         | Density (g/cm$^3$) | Young's modulus (GPa) |
|---------|--------------------|------------------------|
| ABS     | 1.07               | 2.1                    |
| Mg alloy| 1.81               | 445                    |

However, Mg alloy is manufactured by a process of die casting, which easily results in defects on the surface of the casting, with defect rates of up to about 50%. On the other hand, Taiwan is the first in the world in the capacity of manufacturing devices for die casting Mg alloys of NB, but the yields are poor, which is the main bottleneck for productivity. The die casting of Mg alloys faces many defects, with primary causes including that the casting is relatively thin in size; the heat dissipating process is too fast when the metal is solidified; and non-directional solidification occurs. Due to fast heat effusion when the metal is solidified, defects at semi-solid molding include: incomplete thermal shrinking and filling . . . ; defects at Mg alloy die casting include: hot split film, surface oxidation, streaks, surface holes, and outstanding deformation.

Therefore, if a thermal-resistance material is sprayed and coated onto the surface of the Mg-alloy die casting mold (SKD61) or the semi-solid mold as a heat insulating coating, that the heat effusion process will be slowed down when the Mg-alloy die casting mold or the semi-solid mold is solidified, thereby improving the solidification compensation, which conforms to the above-mentioned metal solidification theory.

During the research of thermal-resistance materials with low thermal conductivity coefficients, most thermal-resistance materials are ceramic matrix composites. Currently, thermal-resistance materials have always been used in high-temperature environments, such as turbine blades or their parts. Turbine bladed or their parts are often made of superalloys. Although the material of superalloy is high temperature-resistant, it also faces the problems of being fatigued and destroyed due to being used for a long time. At present, the most common solution is cladding a thermal-resistance material on the surface of the turbine blade or its parts. $ZrO_2$ is the earliest oxide to be used as a thermal-resistance material. With the development of $ZrO_2$ as a thermal-resistance material, many researchers began devoting themselves to developing various $ZrO_2$-based thermal-resistance materials.

At present, the most commonly used thermal-resistance material is Yttria-Stabilized Zirconia (YSZ). To further reduce the thermal conductivity coefficient, some researchers have added other oxides into YSZ, for example, $Nb_2O_5$ is added into YSZ in U.S. Pat. No. 6,686,060.

In U.S. Pat. No. 6,764,779, a 6-8 wt % (weight percent) YSZ layer and an 18-22 wt % YSZ layer are stacked with each other, to reduce the thermal conductivity coefficient. Additionally, other researchers add other oxides into $ZrO_2$. For example, in U.S. Pat. No. 6,284,323, 5-60 mol % $Gd_2O_3$ is added into $ZrO_2$; in U.S. Pat. No. 6,916,551, $Er_2O_3$ is added into $ZrO_2$; both ways can obtain a thermal-resistance material with a low thermal conductivity coefficient.

Furthermore, other researchers have developed other new oxides to replace $ZrO_2$, for example, in U.S. Pat. No. 6,924,040, $Gd_2O_3$ is added into $HfO_2$, and similarly equivalent low thermal conductivity coefficient can be achieved.

In U.S. Pat. No. 6,803,135, $Re_xZr_{1-x}O_y$ ($0<x<0.5$, $1.75<y<2$) acts as the thermal-resistance material cladding on the metal substrate. Re (rhenium) is a rare element on earth, and the rare elements include Ce, Pr, Nd, Pm, Sm, Eu, Th, Dy, Ho, Er, Tm, Yb, and Lu.

In addition to the thermal-resistance material of oxides, in U.S. Pat. No. 6,521,353, a few Mn and Cr are further added into the combination of 50-80 wt % WC and 10 wt % TiC+ Co+Ni to produce a super-hard metal with a low thermal conductivity coefficient.

All of the above patents about thermal-resistance materials are directed to the ceramic matrix composites, especially those with oxide ceramic materials as the main portion. It can be easily known from the above thermal-resistance materials that quite a few rare elements are employed, and material costs will obviously increase.

In most of the patents, the composition of the one that disclosed in U.S. Pat. No. 6,756,131 includes Ni, Co (0.1-12 wt %), Cr (10-30 wt %), Al (4-15 wt %), Y (0.1-5 wt %), Re (0.5-10 wt %), Hf (0-0.7 wt %), and Si (0-1.5 wt %). Although pure metal elements are completely used for the thermal-resistance material of the alloy, quite a few rare elements still must be added into the material.

SUMMARY OF THE INVENTION

In view of the above, the main object of the present invention is to provide a multi metal base thermal resistance alloy, so as to solve the problem in the prior art that the material costs are increased due to the use of the rare elements.

Another object of the present invention is to provide a mold with the multi metal base thermal resistance alloy layer, such that the heat effusion will be slowed down during the solidification in the die casting mold or the semi-solid mold, and solidification compensation will be improved.

The mold with the multi metal base thermal resistance alloy layer in the present invention includes a metal substrate, and the multi metal base thermal resistance alloy layer clad thereon.

In the mold with the multi metal base thermal resistance alloy layer according to an embodiment of the present invention, the metal substrate includes the metal substrate of the thin-walled die casting mold and the metal substrate of the semi-solid mold.

The multi metal base thermal resistance alloy of the present invention includes Co, Cr, Fe, Ni, Si, and Ti, wherein the weight percent of Co is a % ($6\% \leqq a \% \leqq 41\%$) in the total weight of the alloy; the weight percent of Cr is b % ($5\% \leqq b \% \leqq 36\%$) in the total weight of the alloy; the weight percent of Fe is c % ($4\% \leqq c \% \leqq 38\%$) in the total weight of the alloy; the weight percent of Ni is d % ($5\% \leqq d \% \leqq 44\%$) in the total weight of the alloy; the weight percent of Si is e % ($2\% \leqq e \% \leqq 20\%$) in the total weight of the alloy; the weight percent of Ti is f % ($3\% \leqq f \% \leqq 29\%$) in the total weight of the alloy, and a %+b %+c %+d %+e %+f % $\leqq 100\%$.

The multi metal base thermal resistance alloy according to an embodiment of the present invention includes Al or Zr. The weight percent of Al is g % in the total weight of the alloy, $2\% \leqq g \% \leqq 25\%$, and a %+b %+c %+d %+e %+f %+g % $\leqq 100\%$. The weight percent of Zr is h % in the total weight of the alloy, $6\% \leqq h \% \leqq 43\%$, and a %+b %+c %+d %+e %+f %+h % $\leqq 100\%$.

It is an advantage of the present invention that the present invention is made completely of pure metal elements, and no rare elements will be added thereto, such that the manufacturing cost of the thermal-resistance material will be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein:

FIG. 1 shows the data for Embodiments A1 to A8 of the multi metal base thermal resistance alloy according to the present invention, and the measuring results of the hardness value and slit length;

FIG. 4 shows the data for Embodiments B1 to B9 of the multi metal base thermal resistance alloy according to the present invention, and the measuring results of the hardness value and slit length;

FIG. 7 shows the data for Embodiments C1 to C4 of the multi metal base thermal resistance alloy according to the present invention, only with the data of Cr being changed, and the measuring results of the hardness value and the slit length;

FIG. 9 shows the hardness value and the slit length of Embodiment C1, C3, and B8 of the multi metal base thermal resistance alloy according to the present invention;

FIG. 11 shows the plasma spray parameter for spraying and coating the multi metal base thermal resistance alloy in the embodiment of the present invention onto the metal substrate with the plasma spray;

FIG. 13 shows properties of the multi metal base alloy coating in Embodiment B8 of the multi metal base thermal resistance alloy according to the present invention;

FIG. 14 shows material ingredients of Embodiment D1 of the multi metal base thermal resistance alloy according to the present invention;

FIG. 16 shows properties of the multi metal base alloy coating in Embodiment D1 of the multi metal base thermal resistance alloy according to the present invention;

FIG. 17 shows a comparison between the properties of the multi metal base thermal resistance alloys in Embodiments B8, D1 of the present invention and SKD61 hot work mold steel; and FIG. 18 shows a metal filling experiment of the multi metal base thermal resistance alloy of the present invention being used as a coating for a mold with low thermal conductivity.

DETAILED DESCRIPTION OF THE INVENTION

Figure 2:
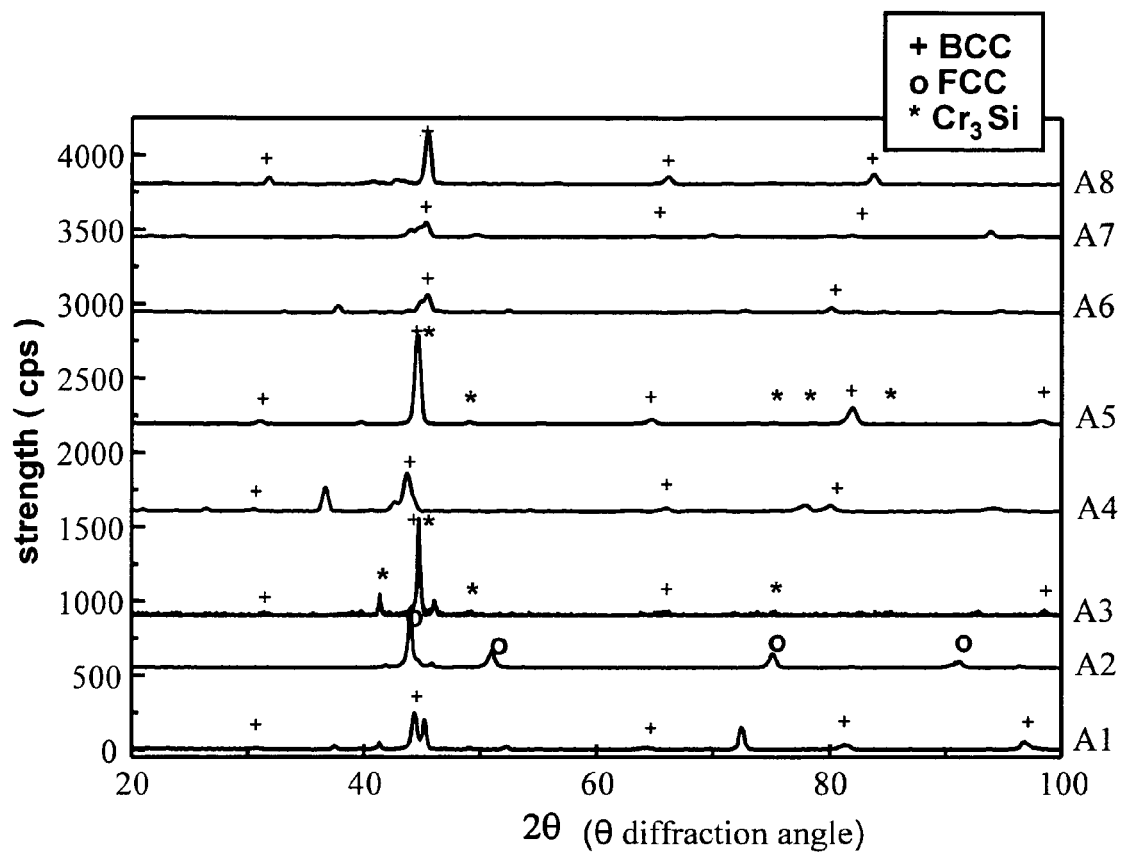
FIG. 2 is an X-ray diffraction pattern for Embodiments A1 to A8 of the multi metal base thermal resistance alloy according to the present invention.

The content of the present invention will be illustrated in detail below through specific embodiments, with reference to the accompanying drawings. All numerals referred to therein refer to corresponding numerals in the drawings.

A mold with a multi metal base thermal resistance alloy layer is provided in the present invention, which includes a metal substrate, and a multi metal base thermal resistance alloy layer clad thereon.

The above metal substrate is, e.g., a metal substrate of the thin-walled die casting mold and a metal substrate of the semi-solid mold.

A multi metal base thermal resistance alloy is provided in the present invention, which includes: Co, whose weight percent is a %, 6%≦a %≦41%, in the total weight of the alloy; Cr, whose weight percent is b %, 5%≦b %≦36%, in the total weight of the alloy; Fe, whose weight percent is c %, 4%≦c %≦38%, in the total weight of the alloy; Ni, whose weight percent is d %, 5%≦d %≦44%, in the total weight of the alloy; Si, whose weight percent is e %, 2%≦e %≦20%, in the total weight of the alloy; Ti, whose weight percent is f %, 3%≦f %≦29%, in the total weight of the alloy; and a %+b %+c %+d %+e %+f %≦100%.

The multi metal base thermal resistance alloy may contain an Al or a Zr element, wherein when Al is included, the weight percent thereof is g %, 2%≦g %≦25%, in the total weight of the alloy, and a %+b %+c %+d %+e %+f %+g %≦100%; when Zr is included, the weight percent thereof is h %, 6%≦h %≦43%, in the total weight of the alloy, and a %+b %+c %+d %+e %+f %+h %≦100%.

The principle of the present invention is as follows:

The thermal conductivity involves complicated transmission properties of phonons and is closely related to micro structures of the material and defects of the crystals. As for the multi metal base thermal resistance alloy of the present invention, the mean free path of carriers and phonons is reduced significantly due to the amorphous micro-structure, and the thermal conductivity coefficient is significantly reduced as well. Therefore, the multi metal base thermal resistance alloy of the present invention has all the following material properties of the desirable thermal-resistance coating (TBC).

(1) It has a low thermal conductivity coefficient (k).
(2) It has a coefficient of thermal expansion (CTE) close to that of, e.g., a Mg-alloy die casting mold (SKD61).
(3) It is capable of forming preferred bonds with substrates, e.g., SKD61, wherein metallic bonding is the most preferred.
(4) It is capable of reducing the residual stress generated when manufacturing the coating and the substrate.
(5) No coating brittle intermetallic phases occur between the coating and the substrate.
(6) The coating has thermal stability of phase (about 600° C.).
(7) The coating material can be mechanically processed, e.g., by grinding or polishing, so as to form a smooth surface.
(8) The coating material is somewhat malleable and tough, so as to reduce thermal fatigue or thermal shock.
(9) The coating has the property of cyclic oxidation resistant (about 600° C.).
(10) The coating material has hardness above Rc 40.

Meanwhile, the multi metal base thermal resistance alloy of the present invention is a metal material that can be processed, and the phonon thermal conductivity coefficient of the amorphous structure is intrinsically low. Therefore, the multi metal base thermal resistance alloy of the present invention is quite suitable for being used as a thermal-resistance coating material on a thin metal sheet with a low fusion point and a semi-solid mold, and is especially suitable for being the coating material on Mg-alloy die casting molds.

When the multi metal base thermal resistance alloy of the present invention is used as a thermal-resistance coating material cladding onto, for example, a thin metal sheet with a low fusion point and a semi-solid mold, the applicable cladding method is that, for example, the multi metal base thermal resistance alloy is first smelted into a multi metal base thermal resistance alloy blocks through the vacuum arc furnace; then, the blocks are made into the multi metal base thermal resistance alloy powder of 74-125 μm through water atomization and ball milling; and then, the multi metal base thermal resistance alloy powder is sprayed and coated onto the metal substrates of the thin metal sheets with a low fusion point or the semi-solid molds by the methods such as plasma spray, high-velocity flame spray, plasma transferred arc melting, physical vapor phase deposition, and chemical vapor phase deposition.

When the coating is clad onto the SKD61 Mg-alloy die casting mold, supposing a coating of 0.5 mm is required to generate sufficient thermal resistance, and the mold cannot be processed in high temperature (If the temperature≧500° C., the mold may be deformed), or when the mold is relatively large, a large furnace is required, such that the volume of the devices will be increased. According to experimentation and research, it is preferred to spray and coat the multi metal base alloy of the present invention on the SKD61 substrate through a plasma spray technique to be formed as a thermal-resistance coating.

In the following embodiments of the present invention, multiple and common pure metal materials, including Cr, Fe, Ni, Si, Ti, and Al, or Zr are used for formulating the alloy systems with different molar ratios by using the Taguchi method, and then they are melted and smelted to become the multi metal base alloy blocks through a vacuum arc furnace. The multi metal base alloy blocks can be made the multi metal base alloy powder with a ball miller. The multi metal base alloy powder can be sprayed and coated onto a metal substrate by the way of plasma spraying to be a thermal-resistance coating material.

The present invention focuses on developing the multi metal base alloy thermal-resistance material with low thermal conductivity coefficient, as well as the coating thereof. As can be known in this laboratory from the accumulated data of experiments and the previous researching results about the multi metal base alloy that the existence of Al, Co, Fe, Ni, and Si facilitates the hardness value (Hv) of the alloy to be maintained at about Hv 900; the influences of the Cr and Ti are not clear. In the first stage of the experiment, the Taguchi experiment with $L_8 2^7$ Orthogonal Array is carried out for seven elements such as Al, Cr, Co, Fe, Ni, Si, and Ti, and the embodiments A1 to A8 are obtained.

FIG. 1 shows the data for embodiments A1 to A8 of the multi metal base thermal resistance alloy according to the present invention, and the measuring results of the hardness value and the slit length. As shown in FIG. 1, it shows the hardness values, silt lengths and thermal conductivity coefficients in the embodiments A1 to A8 of the alloy. The lowest hardness value is Hv 319 (A2), and the highest is up to Hv 1089 (A3). Furthermore, the lowest thermal conductivity coefficient is 6.50 W/mK (Embodiment A3), and the highest is up to 9.32 W/mK (Embodiment A6).

FIG. 2 is an X-ray diffraction pattern for embodiments A1 to A8 of the multi metal base thermal resistance alloy according to the present invention. As shown in FIG. 2, Embodiment A2 focuses on face-centered cubic (FCC) crystalline phase; Embodiments A3 and A5 focus on body-centred cubic (BCC) crystalline phase and $Cr_3Si$ Crystalline Phase; and in the other embodiments, alloys all have structures mainly with the BCC crystalline phase.

Figure 3A:
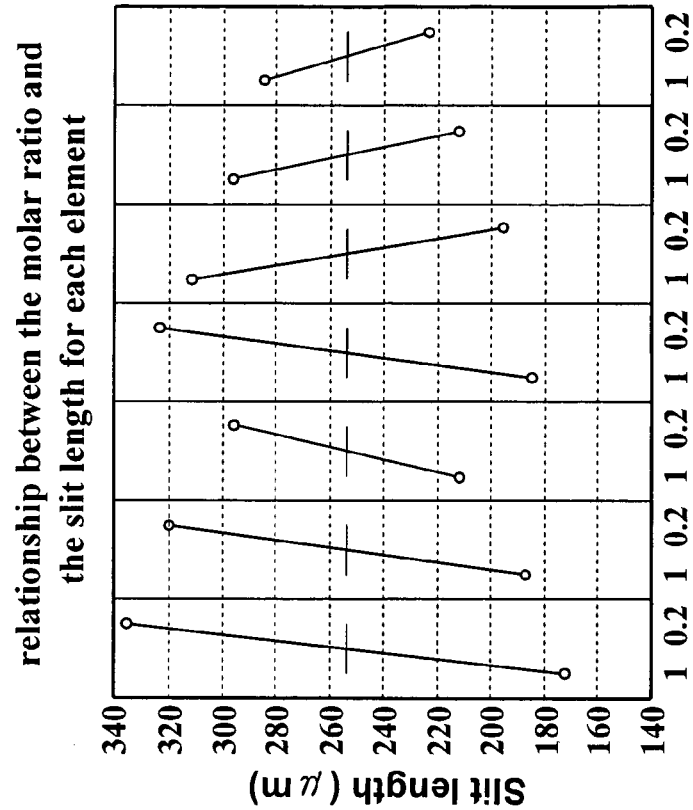
FIG. 3a is a factor response illustration of the relationship between the molar ratio and the hardness for each element in Embodiments A1 to A8 of the multi metal base thermal resistance alloy according to the present invention.
Figure 3B:
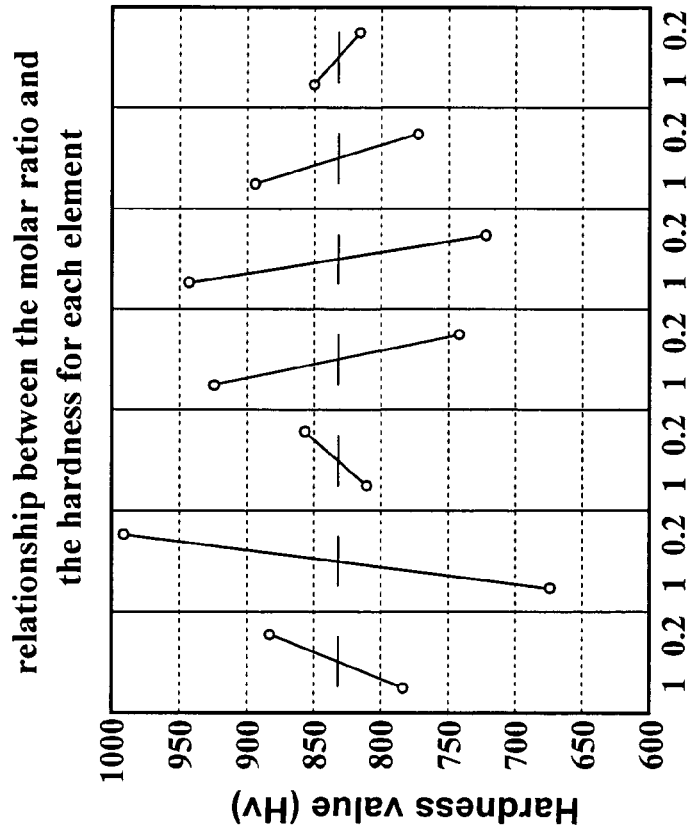
FIG. 3b is a factor response illustration of the relationship between the molar ratio and the slit length of each element in Embodiments A1 to A8 of the multi metal base thermal resistance alloy according to the present invention.

FIG. 3a is a factor response illustration of the relationship between the molar ratio and the hardness for each element in embodiments A1 to A8 of the multi metal base thermal resistance alloy according to the present invention. FIG. 3b is a factor response illustration of the relationship between the molar ratio and the slit length of each element in embodiments A1 to A8 of the multi metal base thermal resistance alloy according to the present invention. As shown in the factor response view of the relationship between the molar ratio, the hardness, and the slit length for each element in FIGS. 3a and 3b, Cr can be used to increase the hardness while reducing the silt length; the influences of Fe, Al, and Ti are slim. According to the above results, the ratio of Fe:Al:Ti=0.2:1:0.2 is fixed, and Ni, Co, Cr, and Si can be varied with three-level molar ratio with reference to the $L_9 3^4$ Orthogonal Array for formulating an alloy, and then embodiments B1 to B9 will be obtained.

FIG. 4 shows the data for embodiments B1 to B9 of the multi metal base thermal resistance alloy according to the present invention, and the measuring results of the hardness value and the slit length. As shown in FIG. 4, it shows the hardness values, the slit lengths and the thermal conductivity coefficients of the alloys in embodiments B1 to B9. The lowest hardness value is Hv 741 (Embodiment B3), and the highest is up to Hv 1017 (Embodiment B9). Furthermore, the lowest thermal conductivity coefficient is 5.79 W/mK (Embodiments B5 and B9), and the highest is up to 9.32 W/mK (Embodiment B3).

Figure 5:
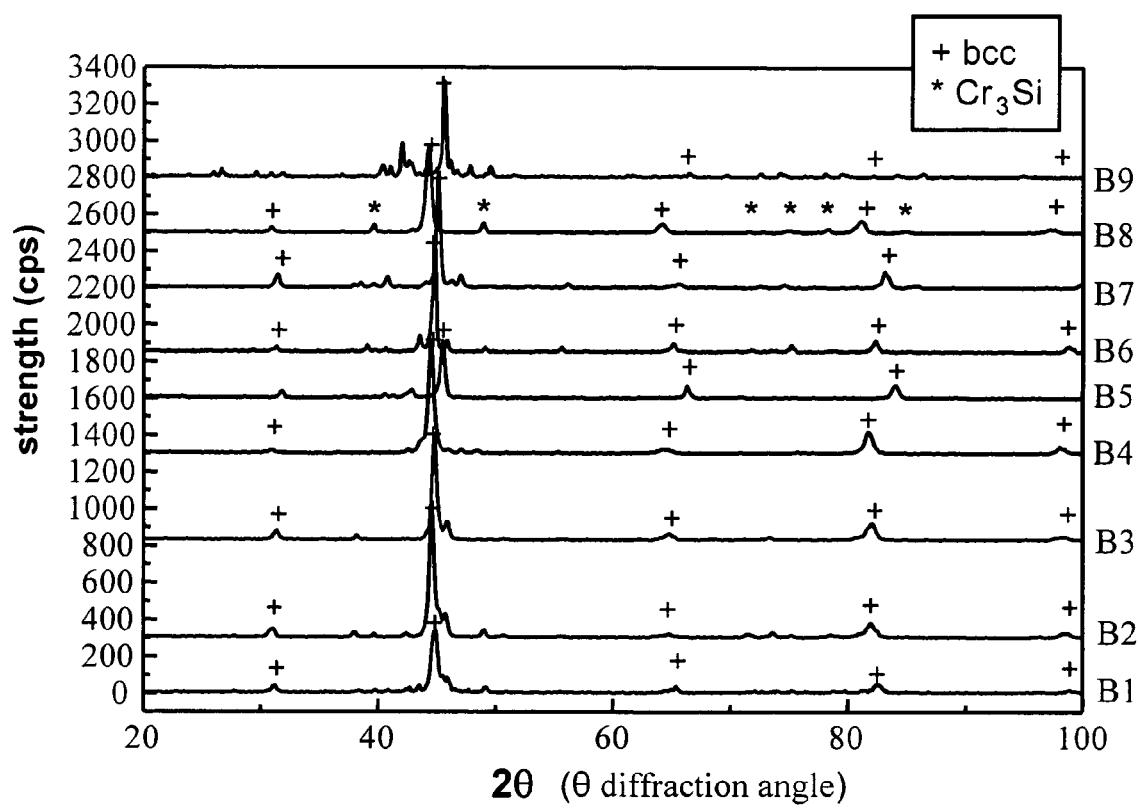
FIG. 5 is an X-ray diffraction pattern of Embodiments B1 to B9 of the multi metal base thermal resistance alloy according to the present invention.

FIG. 5 is an X-ray diffraction pattern of embodiments B1 to B9 of the multi metal base thermal resistance alloy according to the present invention. As shown in FIG. 5, alloys in embodiments B1 to B9 mainly focus on BCC Crystalline Phase; and alloys of B8 has the obvious $Cr_3Si$-phase diffraction peak.

Figure 6B:
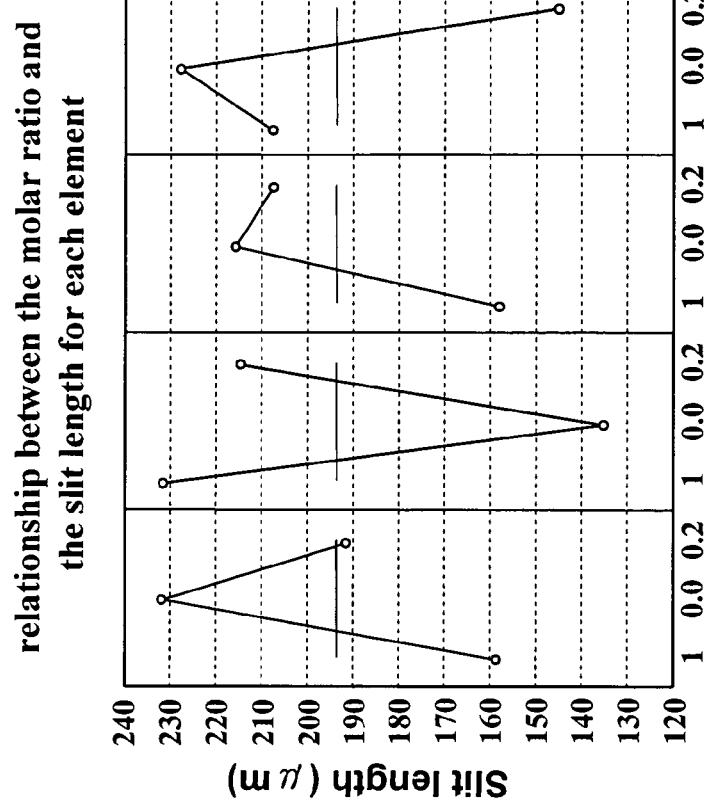
FIG. 6b is a factor response illustration of the relationship between the molar ratio and the slit length of each element in Embodiments B1 to B9 of the multi metal base thermal resistance alloy according to the present invention.
Figure 6A:
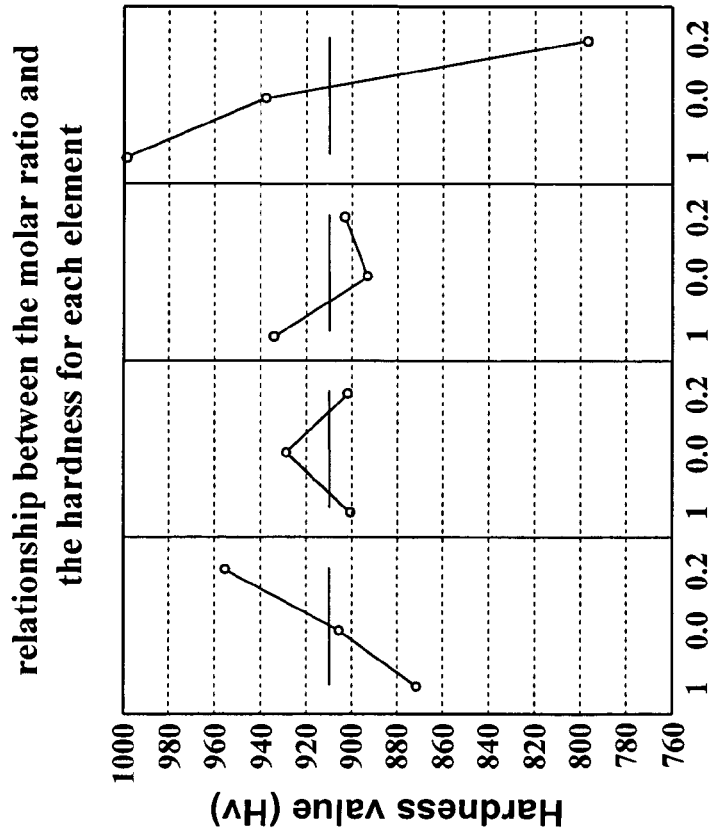
FIG. 6a is a factor response illustration of the relationship between the molar ratio and the hardness of each element in Embodiments B1 to B9 of the multi metal base thermal resistance alloy according to the present invention.

FIG. 6a is a factor response illustration of the relationship between the molar ratio and the hardness of each element in embodiments B1 to B9 of the multi metal base thermal resistance alloy according to the present invention. FIG. 6b is a factor response illustration of the relationship between the molar ratio and the slit length of each element in embodiments B1 to B9 of the multi metal base thermal resistance alloy according to the present invention. As shown in the relationship diagrams between the molar ratio, the hardness, and the slit length for each element of FIGS. 6a and 6b, in the alloys in embodiments B1 to B9, Cr can be used to increase hardness while reducing slit length. It is confirmed from the experimental data of the alloys in embodiments A1 to A8 that, Fe:Al:Ti=0.2:1:0.2; and it is confirmed from the experimental data of the alloys in embodiments B1 to B9 that, Ni:Co:Si=1:0.6:1. Considering both the alloy data in embodiments A1 to A8 and the alloy data in embodiments B1 to B9, the preferred alloy combinations with both desirable hardness and toughness are $AlCo_{0.6}CrFe_{0.2}Ni_{0.2}Si_{0.2}Ti_{0.2}$ and $AlCo_{0.6}CrxFe_{0.2}NiSiTi_{0.2}$.

With the multi metal base alloy of AlCo0.6CrxFe0.2NiSiTi0.2 obtained above, by simply changing the molar ratio of Cr to formulate an alloy, embodiments C1 to C4 are obtained. FIG. 7 shows data for embodiments C1 to C4 of the multi metal base thermal resistance alloy according to the present invention, with only the data of Cr being changed, and the measuring results of the hardness value, the slit length and the thermal conductivity coefficient. As shown in FIG. 7, it shows the hardness values, the slit lengths and the thermal conductivity coefficients for embodiments C1 to C4, wherein the lowest hardness value is Hv 888 (embodiment C1), and the highest is Hv 1045 (embodiment C3 and embodiment C4), and the lowest thermal conductivity coefficient is 8.26 W/mK (embodiment C1) and the highest is 9.40 W/mK (embodiment C4). As can be known from the combined performance of hardness, slit length and thermal conductivity, both embodiments C1 and C3 are preferred.

Figure 8:
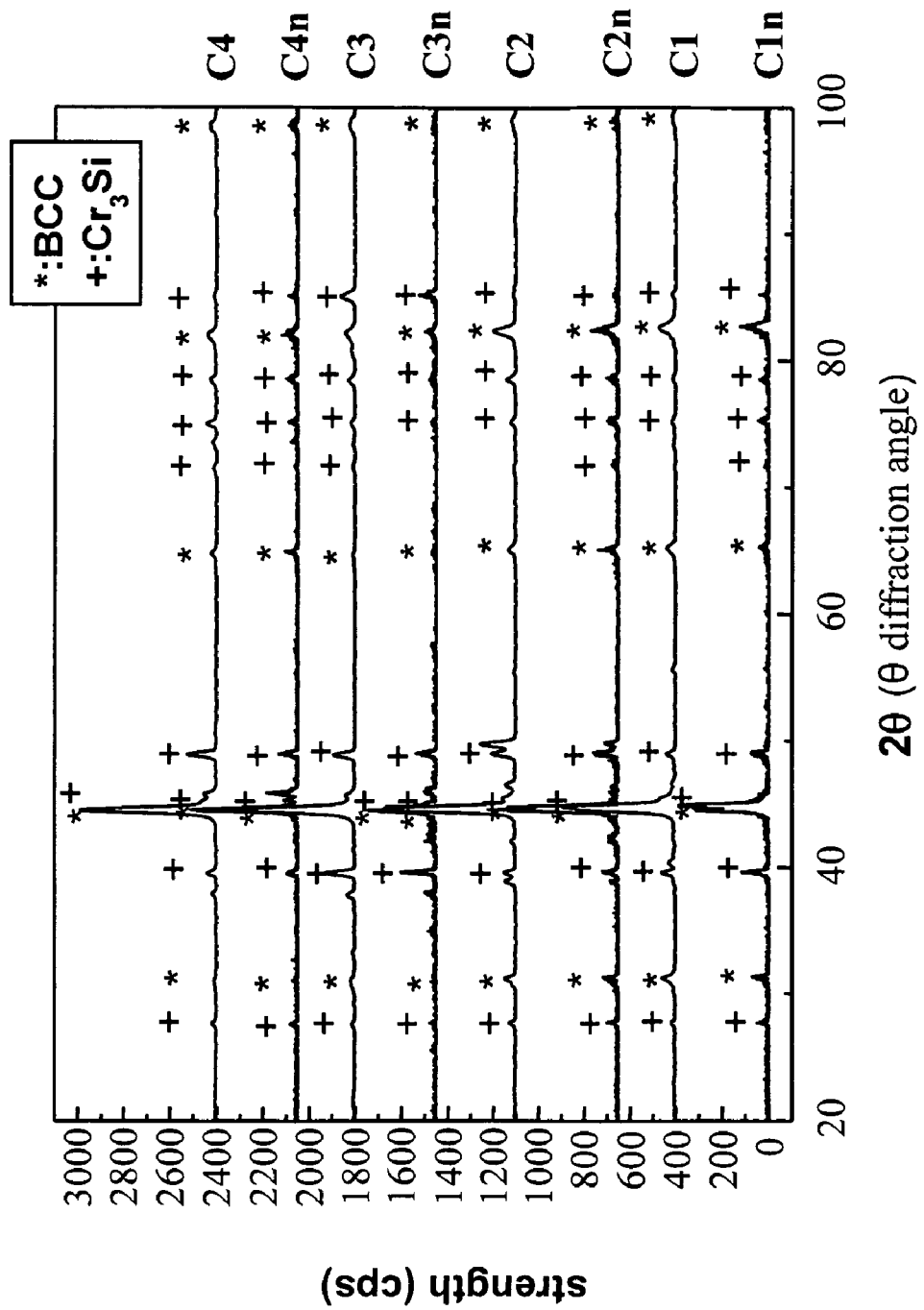
FIG. 8 is an X-ray diffraction pattern of Embodiments C1 to C4 of the multi metal base thermal resistance alloy according to the present invention.

FIG. 8 is an X-ray diffraction pattern of embodiments C1 to C4 of the multi metal base thermal resistance alloy according to the present invention. As shown in FIG. 8, the alloys in Embodiments C1 to C4 are mainly made up of both BCC and $Cr_3Si$ crystalline phases. As the molar ratio of Cr increases, the orderly BCC diffraction peaks (100) gradually disappear. After the homogenizing processing, the diffraction peak of the $Cr_3Si$ phase will be relatively clear.

As can be known from the combined performances of both the hardness and the slit length of the alloys in embodiments C1 to C4, both Embodiments C1 and C3 are preferred. Then, considering both the experimental data of alloys in embodiments A1 to A8 and that of alloys in embodiments B1 to B9, B8 has been found with the highest hardness, and the smallest slit length.

FIG. 9 shows the hardness value and the slit length of embodiment C1, C3, and B8 of the multi metal base thermal resistance alloy according to the present invention. As shown in FIG. 9, although the hardness value of embodiment B8 is not higher than that of embodiment C1 and embodiment C3, it still can achieve Hv 880. The slit length of the embodiment B8 alloy is only 48 μm after the indentation test, much smaller than that of the embodiment C1 alloy and embodiment C3 alloy. Therefore, the embodiment B8 alloy of $AlCo_{0.6}CrFe_{0.2}Ni_{0.2}Si_{0.2}Ti_{0.2}$ is selected as the coating material to be sprayed and coated on the surface of Mg-alloy die casting mold material (SDK61) through plasma spraying.

Figure 10:
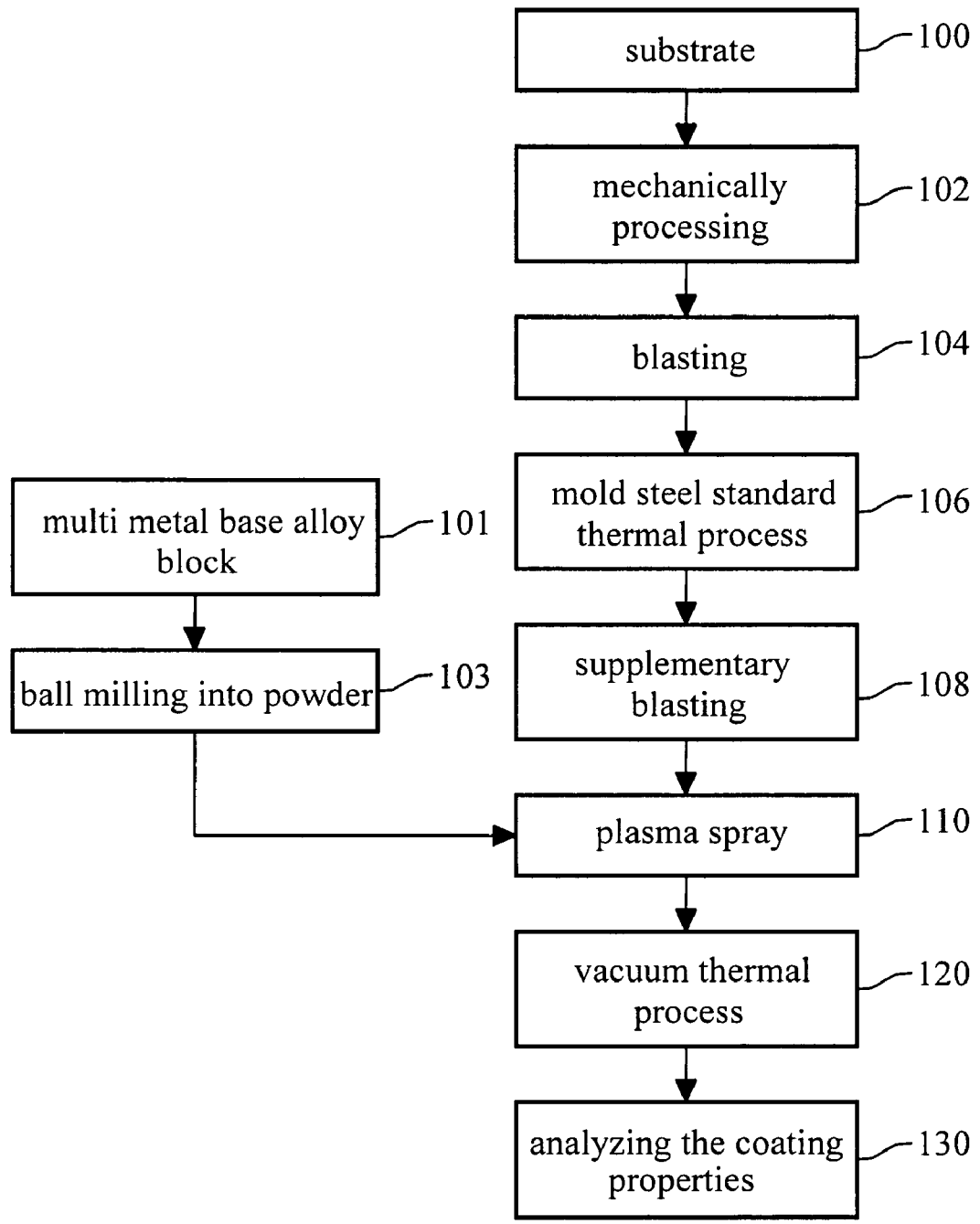
FIG. 10 is an experiment flow chart for spraying and coating the multi metal base thermal resistance alloy in the embodiment of the present invention onto the metal substrate to be used as a thermal-resistance coating material.

FIG. 10 is an experiment flow chart for spraying and coating the multi metal base thermal resistance alloy in the embodiment of the present invention onto the metal substrate to be used as the thermal-resistance coating material. As shown in FIG. 10, in preparing the SKD61 Mg-alloy die casting mold substrate, the surface of the SKD61 Mg-alloy die casting mold substrate 100 is mechanically processed 102, and then the surface of the SKD61 Mg-alloy die casting mold substrate 100 is processed with blasting 104 (Ra=7.5). Then, the SKD61 Mg-alloy die casting mold substrate 100 after the blasting process 104 is treated by the standard thermal process 106 of die steel with one quenching and two tempering procedures, and after that a supplementary blasting 108 (Ra=7.0) is carried out. On the other hand, the multi metal base alloy block 101 of embodiment B8 is crushed into 700 μm granules with a stainless steel crucible, and the granules are put into a ball miller to carry out a process of ball milling into powder 103. The multi metal base alloy block 101 is grinded into 74-125 μm powder with a dry ball miller. The liner of the used container and small balls in the ball miller are all made of $ZrO_2$.

FIG. 11 shows the plasma spray parameter for spraying and coating the multi metal base thermal resistance alloy in the embodiment of the present invention onto the metal substrate through the plasma spray. According to the flow chart of FIG. 10 and the plasma spray parameter of FIG. 11, the powder ground by the multi metal base alloy block 101 of embodiment B8 is sprayed and coated through a plasma spray technique 110 onto the blasting surface of the SKD61 Mg-alloy die casting mold substrate 100 after the surface has been processed. The vacuum thermal process 120 at the temperature of 600° C. is carried out for 2 hours to SKD61 Mg-alloy die casting mold substrate 100 having been sprayed and coated with the multi metal base alloy, so as to simulate usage conditions, and then the properties of the coating 130 are subsequently analyzed.

Figure 12:
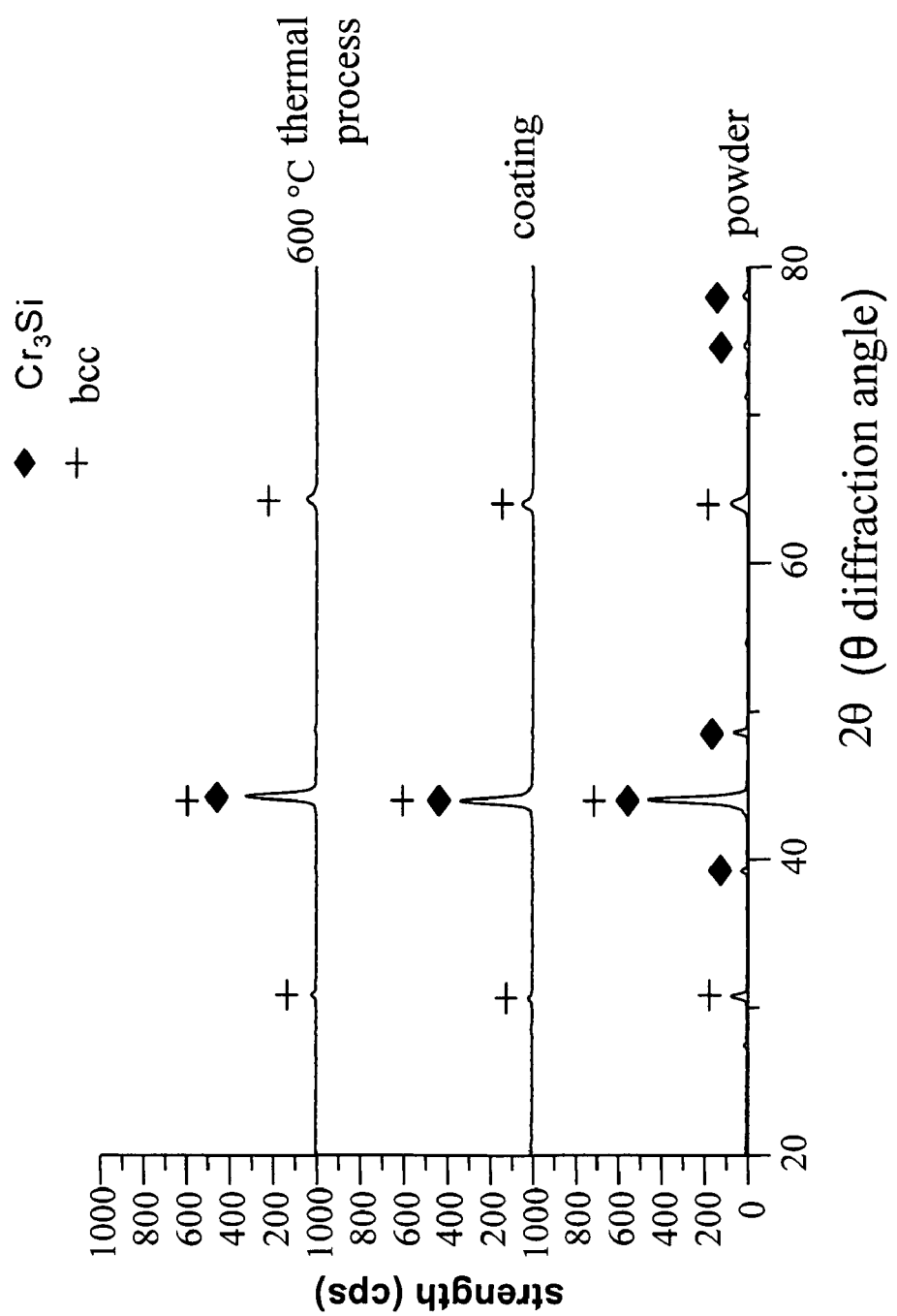
FIG. 12 is an X-ray diffraction pattern of the alloy powder and coating for Embodiment B8 of the multi metal base thermal resistance alloy of the present invention before the vacuum thermal process and after the thermal process.

FIG. 12 is an X-ray diffraction pattern of the alloy powder and coating of the multi metal base thermal resistance alloy embodiment B8 of the present invention before the vacuum thermal process and after the thermal process. As shown in FIG. 12, it can be known from the calculations that, the degree of crystallinity for the alloy in embodiment B8 drops by 34%, and becomes 66%, which indicates that when the powder has been plasma sprayed, the coating tends to become an amorphous phase. After the thermal process, the degree of crystallinity for the alloy in embodiment B8 rises by 8%, and becomes 74%. The structure of the multi metal base alloy coating of embodiment B8 is not significantly crystallized after the thermal process of annealing at 600° C., thus, the coating after the thermal process has phase stability.

FIG. 13 shows the properties of the multi metal base alloy coating of the multi metal base thermal resistance alloy embodiment B8 according to present invention. As can be known from FIG. 13 and the X-ray diffraction pattern of FIG. 12, the plasma spray technique can be used to enable the multi metal base alloy coating of embodiment B8 to have an amorphous structure, such that the thermal conductivity coefficient thereof will be reduced to about 3.24 W/mK.

The multi metal base thermal resistance alloy of the present invention can be melted and smelted to become multi metal base alloy blocks with the vacuum arc furnace. The multi metal base alloy blocks can be made into multi metal base alloy powder by way of ball milling, and then the multi metal base alloy powder can be sprayed and coated on the metal substrate by way of plasma spraying to act as the thermal-resistance coating material. The multi metal base thermal resistance alloy of the present invention used as thermal-resistance coating material tends to have an amorphous structure after being processed by the plasma spray technique, such that it has low thermal conductivity coefficient.

FIG. 14 shows the ingredients of embodiment D1 of the multi metal base thermal resistance alloy according to the present invention. The multi metal base thermal resistance alloy of the present invention can include an element of Al or an element of Zr. Now, the Al in the ingredient of the multi metal base alloy of embodiment B8 is replaced by Zr, and then the multi metal base thermal resistance alloy of embodiment D1 is obtained as shown in FIG. 14. The principle applied to embodiment D1 is that, the radius of Zr ($r_{Zr}$=1.45 Å) is slightly greater than that of Al ($r_{Al}$=1.43 Å), such that it is more easy for Zr to take an amorphous state theoretically, and also the thermal conductivity coefficient of Zr is smaller than that of Al.

Figure 15:
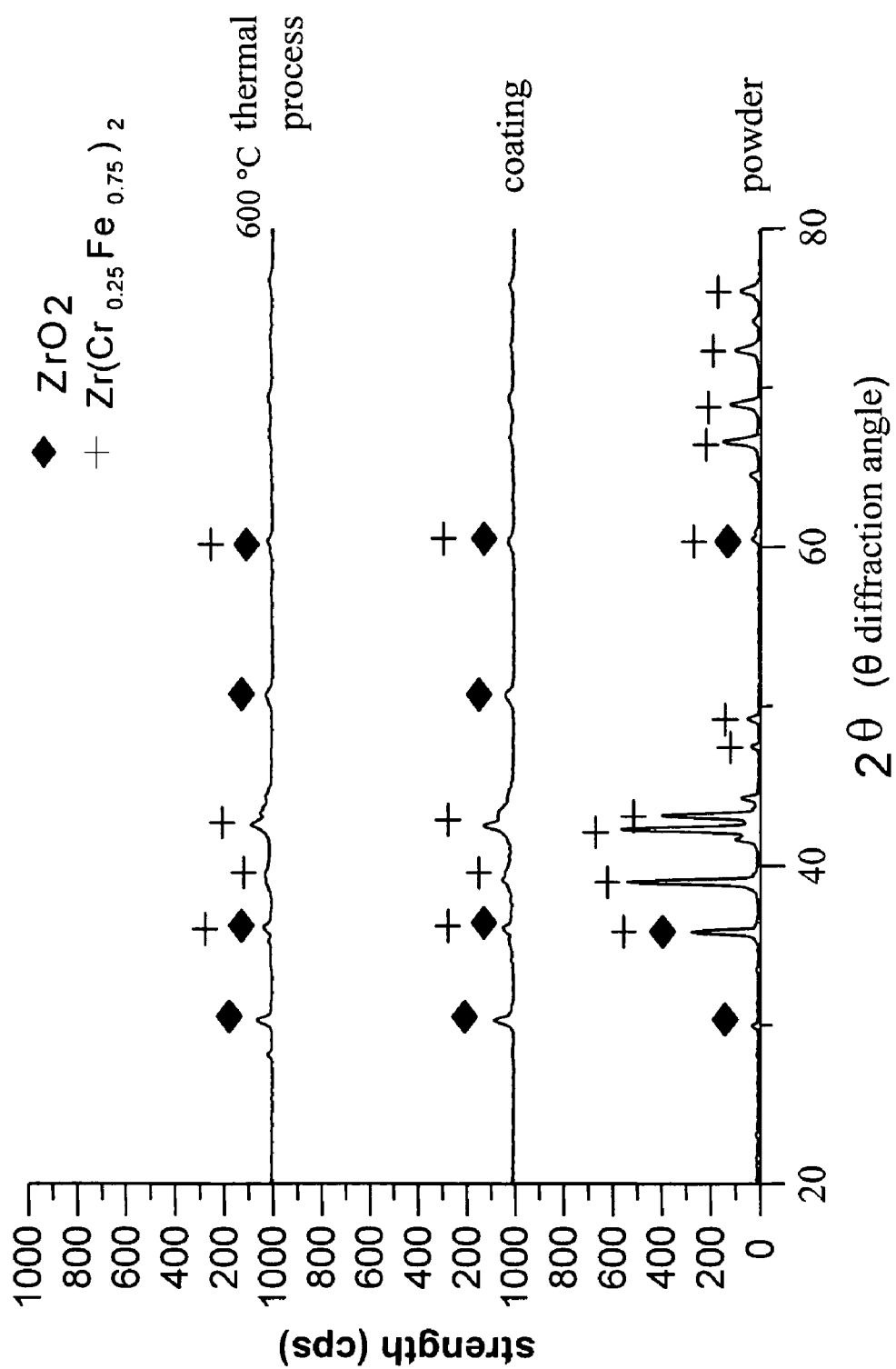
FIG. 15 is an X-ray diffraction pattern of the powder and coating of the multi metal base alloy in Embodiment D1 of the multi metal base thermal resistance alloy of the present invention before the vacuum thermal process and after the thermal process.

FIG. 15 is an X-ray diffraction pattern of the powder and coating of the multi metal base thermal resistance alloy embodiment D1 of the present invention before the vacuum thermal process and after the thermal process. As shown in FIG. 15, it can be known from the calculations that the degree of crystallinity of the material in embodiment D1 drops by 85%, and becomes 15%, which indicates that when the powder in embodiment D1 has been plasma sprayed, the coating significantly tends to form into amorphous state. After the thermal process, the degree of crystallinity of the material in embodiment D1 rises by 9%, and becomes 24%. The multi metal base alloy coating of embodiment D1 is the same as the multi metal base alloy coating of embodiment B8, and its structure is not significantly crystallized after the thermal process of annealing at 600° C.; therefore, the coating also has stability of phase. After the plasma spray process, oxidation occurs in the material of embodiment D1, such that the diffraction peak of $ZrO_2$ will become significantly clear after the Zr in the powder has been oxidized under high temperature.

FIG. 16 shows the properties of the multi metal base alloy coating of the multi metal base thermal resistance alloy embodiment D1 according to the present invention. As known from FIG. 16, together with the X-ray diffraction pattern in FIG. 15, the plasma spray technique also can be used to enable the multi metal base alloy coating of embodiment D1 to form an amorphous structure, and the tendency for forming into amorphous state is relatively strong, such that the thermal conductivity coefficient will be reduced to about 3.14 W/mK, which is lower than that of the multi metal base alloy coating of embodiment B8 (3.24 W/mK).

As for the multi metal base thermal resistance alloy in the present invention, when Zr is used to replace Al, regardless of that thermal conductivity coefficient of Zr is smaller than that of Al, when being used as the thermal-resistance coating material, and being processed by the plasma spray technique, it still tends to form an amorphous structure, such that it has low thermal conductivity coefficient, and the coating also has phase stability.

FIG. 17 shows a comparison between the properties of the multi metal base thermal resistance alloys embodiments B8, D1 of the present invention and hot work die steel SKD61. As shown in FIG. 17, the average hardness of the coating of embodiment B8 is Hv 580; the average hardness of the coating of embodiment D1 is Hv 722, both are higher than the hardness Hv 450 of die steel SKD61 substrate. The interface residual stress of the coating of embodiment B8 is +17.99 Mpa, smaller than the bonding strength of the interface. The thermal conductivity coefficients of the multi metal base alloy coating of embodiments B8, D1 are lower than that of die steel SKD61 by an order.

FIG. 18 shows a metal filling experiment of the multi metal base thermal resistance alloy of the present invention being used as a mold coating with low thermal conductivity. As shown in FIG. 18, as for the mold sprayed and coated with the multi metal base thermal resistance alloy of the present invention, the filling ratio is higher than that of the mode without being sprayed and coated with the multi metal base thermal resistance alloy of the present invention, and the filling ratio will be significantly enhanced, especially when the die casting plunger speed is relatively low (0.1 m/s, 0.2 m/s).

Therefore, more preferred heat retaining effects will be achieved by the multi metal base thermal resistance alloy of the present invention when being used as the thermal-resistance coating material than the die steel SKD61. When the multi metal base thermal resistance alloy of the present invention is used as the thermal-resistance coating, it is still a metal material, which is more preferably processed than ceramic, yet its thermal conductivity coefficient can achieve the level of that of ceramic material.

The multi metal base thermal resistance alloy of the present invention is the thermal-resistance material of the multi metal base alloy with low thermal conductivity coefficient, which is different from the one that is mainly consisted of oxides and carbides in the conventional art. The multi metal base thermal resistance alloy of the present invention is made completely of pure metal elements, without any rare elements being added, such that the manufacturing cost of the low thermal-resistance material will be reduced.

The multi metal base thermal resistance alloy of the present invention utilizes the amorphous structure itself and the lattice distortion due to the difference between atom sizes, to hamper the movement of phonons and carriers, so as to greatly reduce the mean free path of phonons and carriers, and thereby the multi metal base thermal resistance alloy of the present invention has a thermal conductivity coefficient similar to that of ceramic.

The present invention can be used for the die casting mold of the thin-walled metal having a low fusion point, e.g., the die casting of the Mg alloy casing. Currently, die casting molds are mainly made of hot work mold steel SKD61. The multi metal base thermal resistance alloy of the present invention is the metal material, with the CTE thereof being similar to that of SKD61, and the residual stress between the mold substrate and the alloy coating being extremely weak, thus stripping can be avoided.

Since the multi metal base thermal resistance alloy of the present invention is a metal material, it is more malleable and tough, and also can be mechanically processed better, compared with ceramic thermal-resistance materials.

The metal substrate clad with the multi metal base thermal resistance alloy of the present invention can be much more resistant to the thermal cycle of die casting and semi-solid casting than that clad with the ceramic material, such that the forming yields of the thin metal sheets with low fusion points and semi-solid molds are increased, as is the lift time of the mold.

Besides being used to avoid the above problems, the present invention also can be used with a plasma spray technique, such that the problem of requiring a relatively large furnace when the mold is relatively large can be avoided, and accordingly the manufacturing cost of devices can be reduced.

The present invention is different from the cladding of oxide coatings: during spraying and coating of plasma spray, the substrate need not be heated, but carries gas with an extremely high acceleration to crash the melting granules of the multi metal base alloy onto the substrate. Much kinetic energy and thermal energy will be converted during crashing, such that the high temperature will partially occur on the surface of the substrate. Therefore, desirable bonding will be achieved between the coating and the substrate, and the coating will have desirable density.

The multi metal base thermal resistance alloy of the present invention can be applied to the thermal insulating coatings for thin-walled die casting mold and semi-solid molds of 3C goods, such as, NBs, PCs, cell phones, and digital cameras.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi metal base thermal resistance alloy, consisting of:
    Co, a weight percent thereof being a %, $6\% \leq a\% \leq 41\%$, in a total weight of the alloy;
    Cr, the weight percent thereof being b %, $5\% \leq b\% \leq 36\%$, in the total weight of the alloy;
    Fe, the weight percent thereof being c %, $4\% \leq c\% \leq 38\%$, in the total weight of the alloy;
    Ni, the weight percent thereof being d %, $5\% \leq d\% \leq 44\%$, in the total weight of the alloy;
    Si, the weight percent thereof being e %, $2\% \leq e\% \leq 20\%$, in the total weight of the alloy; and
    Ti, the weight percent thereof being f %, $3\% \leq f\% \leq 29\%$, in the total weight of the alloy;
    wherein a %+b %+c %+d %+e %+f %=100%.

2. A mold with a multi metal base thermal resistance alloy layer, comprising:
    a metal substrate; and
    a multi metal base thermal resistance alloy layer, clad onto the metal substrate, wherein the multi metal base thermal resistance alloy layer comprises the multi metal base thermal resistance alloy of claim 1.

3. The mold with a multi metal base thermal resistance alloy layer according to claim 2, wherein the metal substrate includes a metal substrate of a thin-walled die casting mold or a metal substrate of a semi-solid mold.

4. A multi metal base thermal resistance alloy, consisting of:
    Co, a weight percent thereof being a %, $6\% \leq a\% \leq 41\%$, in a total weight of the alloy;
    Cr, the weight percent thereof being b %, $5\% \leq b\% \leq 36\%$, in the total weight of the alloy;
    Fe, the weight percent thereof being c %, $4\% \leq c\% \leq 38\%$, in the total weight of the alloy;
    Ni, the weight percent thereof being d %, $5\% \leq d\% \leq 44\%$, in the total weight of the alloy;
    Si, the weight percent thereof being e %, $2\% \leq e\% \leq 20\%$, in the total weight of the alloy;
    Ti, the weight percent thereof being f %, $3\% \leq f\% \leq 29\%$, in the total weight of the alloy; and
    Al, the weight percent thereof being g %, $2\% \leq g\% \leq 25\%$, in the total weight of the alloy;
    wherein a %+b %+c %+d %+e %+f %+g %=100%.

5. A mold with a multi metal base thermal resistance alloy layer, comprising:
    a metal substrate; and
    a multi metal base thermal resistance alloy layer, clad onto the metal substrate, wherein the multi metal base thermal resistance alloy layer comprises the multi metal base thermal resistance alloy of claim 4.

6. A multi metal base thermal resistance alloy, consisting of:
    Co, a weight percent thereof being a %, $6\% \leq a\% \leq 41\%$, in a total weight of the alloy;
    Cr, the weight percent thereof being b %, $5\% \leq b\% \leq 36\%$, in the total weight of the alloy;
    Fe, the weight percent thereof being c %, $4\% \leq c\% \leq 38\%$, in the total weight of the alloy;
    Ni, the weight percent thereof being d %, $5\% \leq d\% \leq 44\%$, in the total weight of the alloy;
    Si, the weight percent thereof being e %, $2\% \leq e\% \leq 20\%$, in the total weight of the alloy;
    Ti, the weight percent thereof being f %, $3\% \leq f\% \leq 29\%$, in the total weight of the alloy; and
    Zr, the weight percent thereof being h %, $6\% \leq h\% \leq 43\%$, in the total weight of the alloy;
    wherein a %+b %+c %+d %+e %+f %+g %=100%.

7. A mold with a multi metal base thermal resistance alloy layer, comprising:
    a metal substrate; and
    a multi metal base thermal resistance alloy layer, clad onto the metal substrate, wherein the multi metal base thermal resistance alloy layer comprises the multi metal base thermal resistance alloy of claim 6.

* * * * *